United States Patent [19]

Winchester et al.

[11] 3,815,100

[45] June 4, 1974

[54] SELF-CLOCKING SYSTEM UTILIZING GUARANTEED BIT TRANSITION

[75] Inventors: John E. Winchester, Sudbury; Edward B. Rawson, Lincoln, both of Mass.

[73] Assignee: Searle Medidata, Inc., Waltham, Mass.

[22] Filed: Nov. 7, 1972

[21] Appl. No.: 304,552

[52] U.S. Cl. ........................ 340/172.5, 340/347 DD

[51] Int. Cl. .......................... H03k 7/02, G06f 15/42

[58] Field of Search ............ 340/174.16, 347, 172.5

[56] References Cited

UNITED STATES PATENTS

| | | | |
|---|---|---|---|
| 3,098,215 | 7/1963 | Waite | 340/172.5 X |
| 3,344,409 | 9/1967 | Townsend | 340/172.5 |
| 3,633,174 | 1/1972 | Griffin | 340/172.5 |
| 3,633,201 | 1/1972 | Oesterlin | 340/347 AD |
| 3,648,248 | 3/1972 | Deman et al. | 340/172.5 |
| 3,652,999 | 3/1972 | Hjort | 340/172.5 |
| 3,681,756 | 8/1972 | Burkhard et al. | 340/172.5 |
| 3,685,048 | 8/1972 | Pincus | 340/347 AD |
| 3,689,913 | 9/1972 | Newcomb | 340/347 DD |
| 3,696,401 | 10/1972 | Vance | 340/347 DD |
| 3,702,463 | 11/1972 | Lesniewski | 340/172.5 |
| 3,754,237 | 8/1973 | de Laage de Meux | 340/347 DD |

*Primary Examiner*—Paul J. Henon
*Assistant Examiner*—Paul R. Woods
*Attorney, Agent, or Firm*—Weingarten, Maxham & Schurgin

[57] ABSTRACT

A system for digitizing signals for recording and/or transmission in a self-clocking mode. Simplified electronics are provided to sample an analog signal, typically an electrocardiogram signal, and convert its amplitude to a digital representation which is subsequently transformed into a simply generated, guaranteed bit transition self-clocking binary signal for use in medical data recording and transmission.

13 Claims, 13 Drawing Figures

SELF-CLOCKING SYSTEM UTILIZING GUARANTEED BIT TRANSITION

FIELD OF THE INVENTION

This invention relates to synchronizing digital data to a clock and more particularly to the provision of a self-clocking digital representation typically of medical information.

BACKGROUND OF THE INVENTION

According to prior art techniques synchronizing of digital data and clock signals is achieved by simultaneously applying data and clocking signals to separate channels of a system so that bit and word divisions necessary for proper data reception and interpretation can be maintained.

Recently digital conversion techniques have been employed to provide binary signals that are self-clocking in that both data and clocking information is contained in a single composite signal. Such techniques eliminate the need for a parallel channel to carry only clocking information.

In the field of large scale medical testing large amounts of data are collected daily in clinics or medical centers representing physiological conditions in a number of patients. This data is typically generated from plural local or remote test stations and it is often stored temporarily in high density on multitrack tape recorders or disk memories and subsequently read into a computer for analysis of patient conditions. For these storage or transmission purposes, a self-clocking format is ideal, making most efficient use of existing recording and transmission capability while maintaining flexiblity in permitting plural data sources to operate with different recording and transmitting units.

BRIEF SUMMARY OF THE INVENTION

In accordance with a preferred embodiment of the present invention a data conversion system is indicated for use with multiple data sources and utilization units typically operating in a medical data environment. A unique and sophisticated system design approach permits the realization of simplified conversion electronics to respectively generate a self-clocking digital signal from analog signal inputs and to decode the digital signal to customary binary formats and/or analog equivalents. The simplified electronics so used are easily incorporated into existing data stations without requiring expensive modification, and in themselves are provided at low cost.

In the exemplary circuitry employed, electronics for providing an analog-to-digital conversion cooperate with electronics of the self-clocking converter to produce an overall system that efficiently achieves analog-to-digital conversion and clocking. A sequence of multi-bit digital data words resulting from the analog-to-digital conversion is transformed by a logic system using the timing of the analog-to-digital converter into a self-clocking binary signal. This binary signal has a level transition coincident with each bit position in the data words and an intermediate transition to represent the presence of a predetermined bit state in each bit location. Framing information is indicated by the absence of the guaranteed transition at data word separations. Decoding of this self-clocking binary signal and optional analog restoration is accomplished using logic that compensates for the bandwidth limitation of the recorder or transmission channel and that is tolerant to substantial variations in storage tape speed at normal operation rates but detects abnormal tape speeds reflecting start up or stop conditions to inhibit the data system at those times.

BRIEF DESCRIPTION OF THE DRAWINGS

These and other features of the invention will be more clearly understood by reference to the detailed description of a preferred embodiment presented below for purposes of illustration, and not by way of limitation, and to the accompanying drawings of which.

DETAILED DESCRIPTION OF A PREFERRED EMBODIMENT

Figure 1:
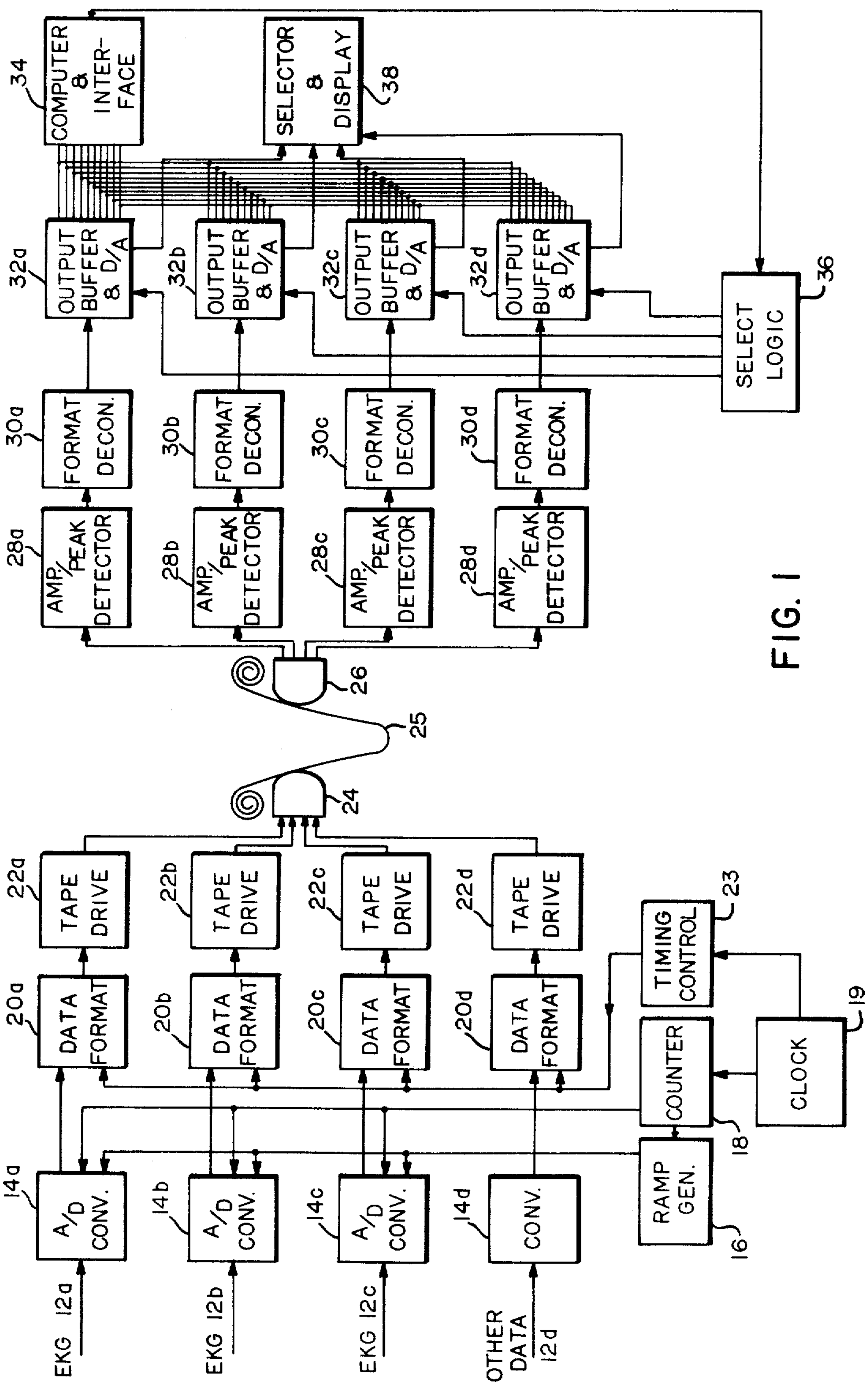
FIG. 1 is a system block diagram indicating a multichannel data system according to the invention.

Referring to FIG. 1 an overall system configuration is shown for providing four channel digital encoding of analog signals and conversion to self-clocking binary outputs for typical application to a recording or transmission medium. A corresponding deconverting and decoding system for signals detected from the medium is provided. In a particular application, a plurality of medical information signals in analog form are provided on lines 12a–12c for application to respective analog-to-digital converting systems 14a–14c. Other data in analog or digital form on line 12d is applied to a converter 14d to provide a compatible digital output for system use.

The analog-to-digital converters 14a–14c receive periodically generated ramp signals from a generator 16 as well as digital signals from a counter 18 which provides corresponding digital representations of the analog signal from generator 16. Generator 16 is driven by counter 18 which in turn is stepped by a clock 19. The converters 14a–14c provide appropriate digital outputs representative of each sample of the analog signals applied to the converters. The outputs of converters 14a–14d are applied to data format generators 20a–20d which convert the digital inputs to a self-clocking binary output having a guaranteed level transition corresponding with each bit position in the digital input and additional transitions to mark the presence of a predetermined bit in each bit position. A timing control system 23 driven by clock 19 provides appropriate clocking intervals and bit position indications to format generators 20a–20d. *Tape drive systems 22a–22d* respond to the respective outputs of the format generators 20a–20d to apply appropriate signal levels to each element in a four track tape head 24 for recording on a magnetic tape medium 25. A four track receive head 26 receives the recorded indicia and applies respective signals to high gain peak detectors 28a–28d. The function of the peak detectors 28a–28d is to provide wave shaping for the signals detected by the head 26 in the event that the digital transitions lose their steepness as is possible over long transmission lines or limited bandwidth recording systems. The outputs of the detectors 28a–28d are applied to respective format deconverter systems 30a–30d where the self-clocking, guaranteed bit transition signals are converted back to the normal digital format comprising a sequence of data words containing arrangements of bits which reflect the original medical information. The outputs of the format deconverters 30a–30d are applied to output buffers 32a–32d which include respective digital-to-analog converters so that both analog and digital output representations are provided by buffers 32a–32d. Parallel digital outputs comprising a complete data word representative of the analog value of each sample of the input signals are applied in unison to a computer 34 which includes an interface system operated by a select logic 36 to determine which buffer 32a–32d is caused to apply data to the computer 34. The analog outputs of the output buffer and digital-to-analog converters 32a–32d are provided to a selector and display system 38 which includes an analog display device for visual presentation of an analog signal selected from converters 32a–32d.

Figure 2:
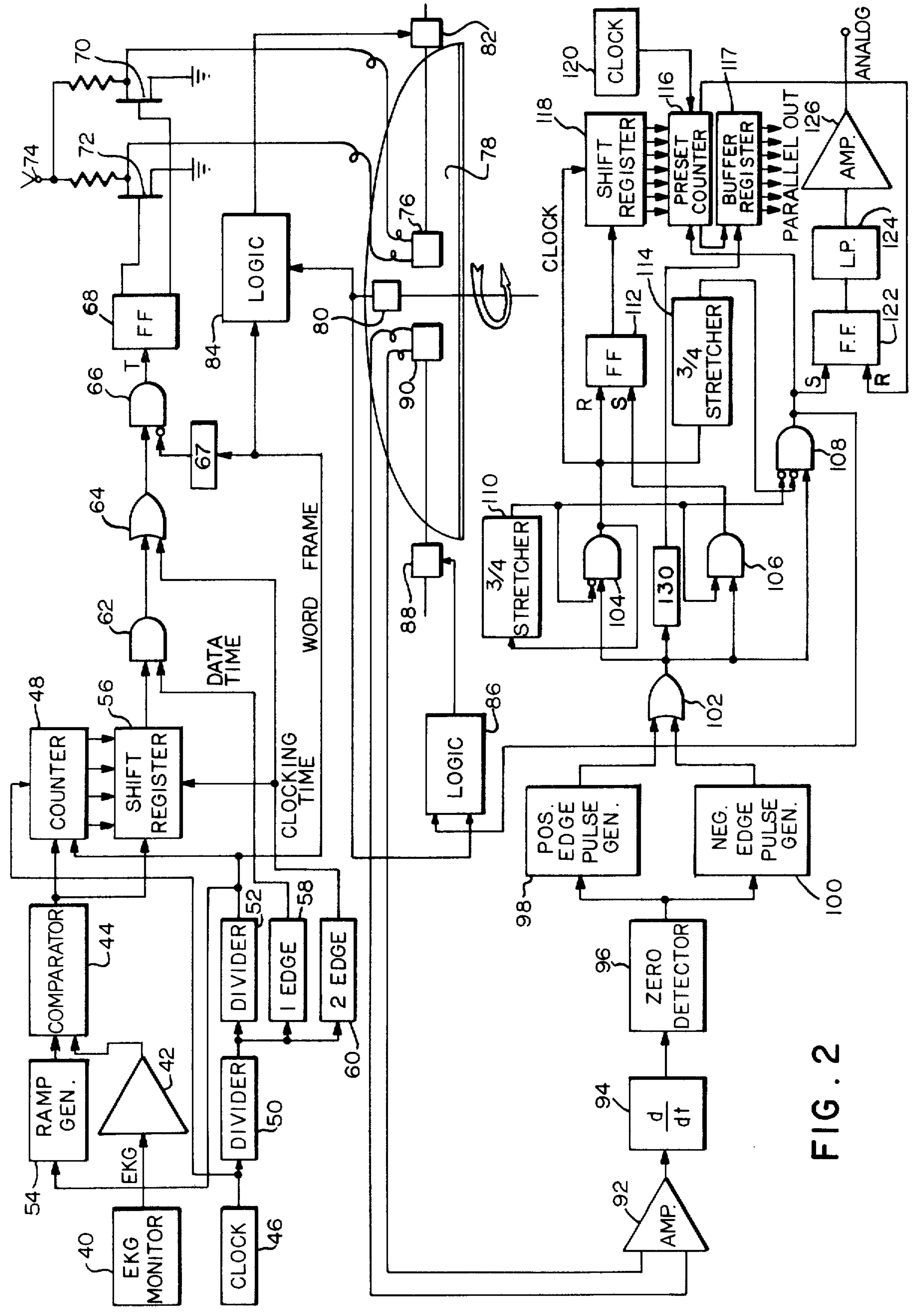
FIG. 2 is a block and partial schematic diagram indicating logic and functional modules of one channel of digital conversion according to the invention.

Turning now to FIG. 2, a detailed functional block and schematic diagram is indicated of a single channel which may be a part of the FIG. 1 multi-channel system. The single channel shown in FIG. 2 is, however, indicated in use with a magnetic disk recording system rather than a multi-channeled tape recorder and thus permits description of the particular advantages of the system for use with such a disk memory.

Analog signals which may typically be the output of electrocardiogram or other medical detection equipment are applied from an EKG monitor 40 through an amplifier 42 to a comparator 44. A clock 46 provides overall system timing in the manner indicated for FIG. 1, clock 19. A high frequency output of the clock 46 is applied to a counter 48 which increments its digital count one bit in response to each clock pulse. A divider 50 responds to the same clock pulses and provides a much slower rate pulse output representative of the digital bit rate for the system. This low rate pulse output is applied to a divider 52 which in turn generates less frequent pulses to represent the sampling intervals for the analog signal from the EKG monitor 40. Each sampling interval pulse from divider 52 resets a ramp generator 54 which, after reset, provides a linearly increasing voltage level output that is applied to a comparison input of the comparator 44. When the comparator 44 detects equality between its two inputs, one from the ramp generator 54 and the other from the amplifier 42, it provides an identity indicating output signal to counter 48 and to a shift register 56 causing the shift register to accept the binary state of the counter 48 in parallel at the instant of detected identity. In this manner, as is known in the art, the shift register 56 will contain a digital representation of the amplitude of the analog signal from the EKG monitor at the instant of sampling. The counter 48 is reset by the output of the divider 52 at the beginning of each sampling interval to commence its digital accumulation from a preset level.

Figures 3A, 3B, 3C, 3D, 3E, 3F, 3G, 3H, 3J, 3K, 4:
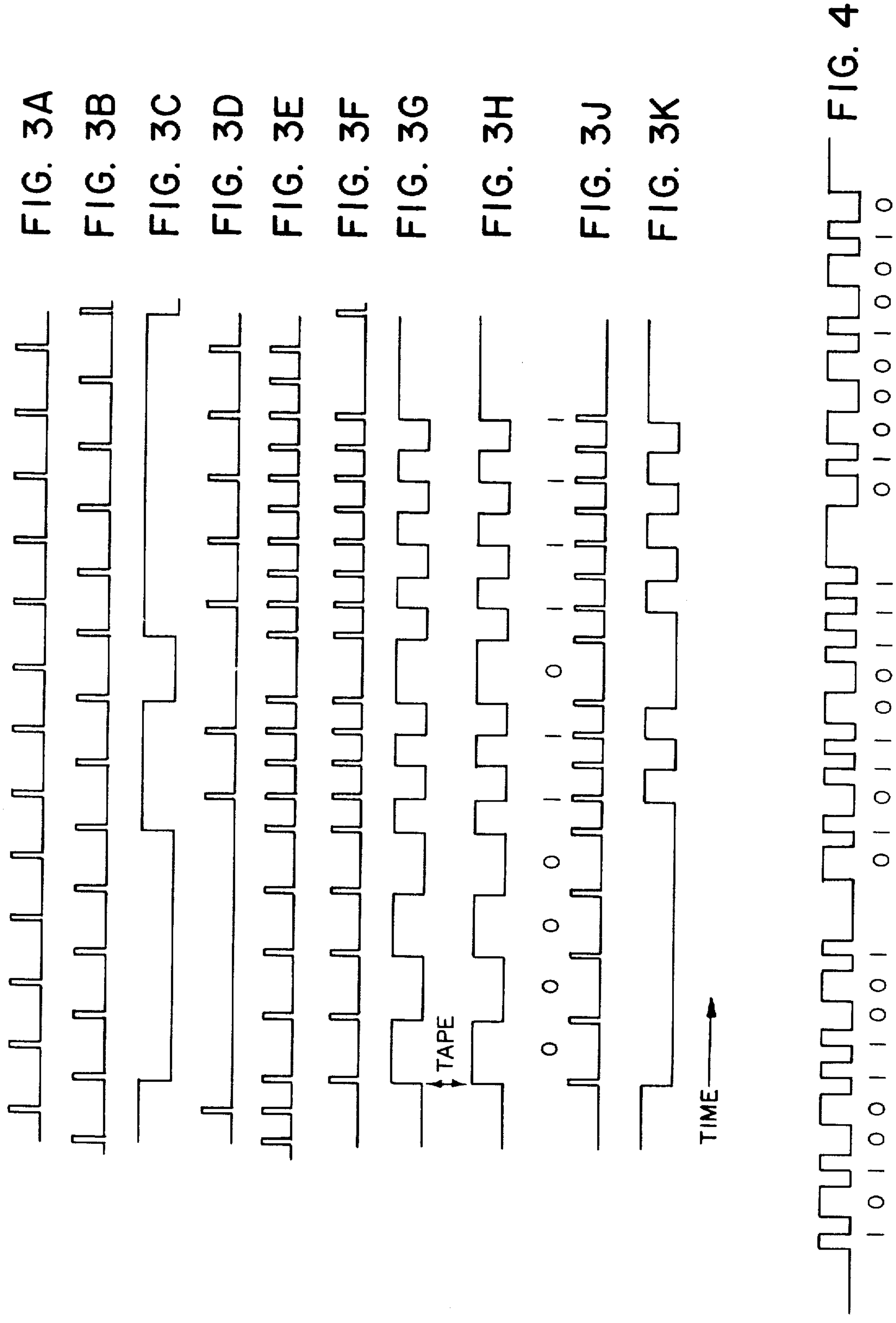
FIG. 3A–3H and 3J–3K contains waveform diagrams useful in explaining the operation of the system.
FIG. 4 is a waveform diagram indicating a self-clocking binary signal according to the invention.

The bit rate pulses from the divider 50 are applied to a first edge pulse generator 58 and second edge pulse generator 60 which in turn produce 180° out-of-phase pulses marking, respectively, the leading and trailing edges of the square wave pulses from the divider 50. The output of the trailing edge generator 60, "clocking time," is applied to the shift register 56 to cause it to shift out the digital data word one bit at a time into the input of an AND gate 62 in response to each clocking time pulse. A second input of the AND gate 62 is taken from the output of the leading edge generator 58, which defines a "data time." The operation of the AND gate 62 is to pass the data time pulse only if the bit position shifted from the register 56 contains a predetermined bit level, in this case a 1. Referring to FIG. 3 and in particular FIGS. 3A and 3B, the outputs of the leading and trailing edge generators 58 and 60 are respectively indicated. In FIG. 3C a typical data word as would be contained in the shift register 56 is indicated. As a result of the operation of the AND gate 62 on the output of the shift register 56 the pulse train indicated in FIG. 3D is produced having pulses only during the one level in the data word shifted out of the register 56. The output of the AND gate 62 is applied to an OR gate 64 along with the clocking time output of the trailing edge generator 60. The resulting output, which is the sum of the two inputs, is indicated in FIG. 3E and is passed to one input of an AND gate 66. The second input of gate 66 is received from the output of the divider 52 indicating the sampling interval, or framing information, to be inserted on each end of the digital word from the shift register 56. The input from the divider 52, the word frame, is inverted by the AND gate 66 so as to provide an inhibit condition only for a short period coincident with the framing for the data word. As a result, the output of the AND gate 66 is a reproduction of the FIG. 3E signal with pulses eliminated during framing as indicated in FIG. 3F. Framing inhibition in gate 66 is for a duration greater than the interval between data time pulses. Where necessary an additional stretcher 67 may be employed.

The output of AND gate 66 is applied to a toggle input of a flip-flop 68 which accordingly changes its binary state in response to each pulse from the AND gate 66, this binary state being indicated in FIG. 3G. By correlating FIG. 3G with FIGS. 3B and 3C it can be seen that the flip-flop 68 produces a binary level transition each binary interval in clocking time specified by the output of the trailing edge generator 60, but also produces a transition intermediate the guaranteed clocking transitions whenever the bit position shifted from the register 56 is a binary one state. Thus complete clocking and message data is contained in the digital signal of FIG. 3G.

The inverting and noninverting outputs of the flip-flop 68 are applied to gate terminals of respective electronic switches 70 and 72, to apply current from a source 74 through the coil of a disk head 76 in opposite directions depending upon the state of the flip-flop 68. While not an essential part of the invention, the recording system is described as including a magnetic disk 78, rotated by a motor 80. The position of the head 76 may be controlled by a head positioner 82 to cause the head 76 to apply magnetic indicia in one of a plurality of concentric channels on the magnetic disk 78 or, in a spiral band as desired. A logic system 84 may typically control the head positioner 82 in correspondence with selected counts of the word frame signals from the divider 52 and disk angular orientation signals from the motor 80. The disk recording system exemplifies the flexibility of the self-clocking system in applying digital signals to a recording medium and recovering the same signals without synchronizing or speed control provisions.

A similar logic system 86 controls a playback head positioner 88 and correspondingly the position of a playback head 90. Detected magnetic indicia in the disk 78 are applied from the head 90 to an amplifier 92 and a differentiator circuit 94 which converts the magnitude peaks of the recovered signal into zero crossings. The zero crossings are detected by a zero detector 96, for example by comparison techniques, to provide the output signal of FIG. 3H in response to the recorded signal in FIG. 3G. This signal is applied to positive and negative edge pulse generators 98 and 100 respectively, the outputs of which are summed by an OR gate 102 to provide the pulse output of FIG. 3J similar to that of FIG. 3E.

The output of the OR gate 102 is applied to noninverting inputs of AND gates 104, 106 and 108. The output of the AND gate 104 is applied to a three-quarter period pulse stretcher 110 comprising, for example, a monostable circuit providing a pulse duration established at three-quarters of the interval between pulses in the "clocking time" from the generator 60. The output of this pulse stretcher 110 is applied to inverting inputs of AND gates 104 and 108 and a noninverting input of the AND gate 106. The output of the AND gates 104 and 106 are applied to "reset" and "set" terminals of a flip-flop 112.

The output of the AND gate 104 is also applied to a second three-quarter period pulse stretcher circuit 114 which in turn applies its output to an inverting input of the AND gate 108. The AND gate 108 provides word frame signals which are applied to the logic 86 as well as to a reset input of a presetable counter 116 connected to a buffer register 117.

The output of the flip-flop 112 will be as indicated in FIG. 3K for the same signals considered above and this binary signal is clocked into a shift register 118 by the output of the AND gate 104. The contents of the shift register 118 are preset into the counter 116 in response to the framing signal from the AND gate 108, and the resulting parallel digital output provides the digital indication of a complete data word as indicated in FIG. 3K. FIG. 4 is exemplary of a series of complete digital words separated by framing intervals.

The counter 116 also responds to a high frequency clock 120 to count from its preset value back to a zero digital state to reset a flip-flop 122, which is set in response to the framing signal from the AND gate 108. The output of the flip-flop 122 thus provides a pulse signal with a width representative of the amplitude of the original analog signal. This pulse width modulated signal is low-pass filtered by a filter 124 then boosted by amplifier 126 to provide a reproduction of the original analog signal at the input of the system from the EKG monitor 40.

Referring to FIG. 3J, it is seen that disregarding framing intervals, the interval between the pulses at the output of the OR gate 102 is of two lengths. One, the longer, being the period between bits according to the system bit rate established by the "clocking time" and the other, the shorter, being just half that interval. Considering the pulse stretcher 110 to be in an untriggered state, the first pulse at the output of gate 102 will trigger it into an "on" condition which will inhibit the AND gate 104 directly after that pulse resets flip-flop 112. AND gate 104 will reject all subsequent pulses until at least half and no more than all of the longer interval has passed, three-quarters of that interval having been selected as a midpoint. Should a short interval between pulses occur, the AND gate 104 will reject that pulse and catch the next pulse which occurs. It is possible, for example during a start up condition of the tape disk 78, that the clocking signals from the AND gate 104 could be 180° out of phase. This condition will last only up until the first representation of the zero bit in the FIG. 3J signal is encountered at which time the clocking output will become in phase as long as the magnetic disk 78 is driven at approximately the correct speed. A speed tolerance as can be seen, of at least 25 percent is inherent in the system. 33 ⅓ percent is possible if a ⅔ interval is used for pulse stretcher 110. In this case an inhibit signal may be applied for at least the first data word by a reset signal on the output buffer register 117 derived from an inhibit delay circuit 130 until a period after the first data word. Thereafter the clocking interval is properly established at the output of the AND gate 104 by the zeros in the previous data or by the framing interval. The clocking interval also establishes the proper timing for the AND gate 106 to detect intermediate pulses representative of binary one states in the original data word. These intermediate pulses set the flip-flop 112. An additional delay interval is established from the output of the monostable circuit 114 and applied to the AND gate 108 to provide accurate detection of frame signals as being at least one system period interval in length, one and a half having been chosen to provide a safety margin that permits a magnetic disk speed tolerance of at least 30 percent.

It is now to be appreciated that the indicated self-clocking system provides a substantially wide tolerance in both recording medium rate as well as bandwidth which degrades the sharp digital transitions of the recorded signal. This allows relatively less expensive components to be used for the typically medical data taking system while at the same time providing the advantage of self-clocking signals which eliminates the need for parallel clocking information. The resulting clocking electronics employs timing signals useful for multiple channels and which cooperate to provide sampling signals for the analog-to-digital and digital-to-analog converting without the need for additional timing logic.

It will occur to those skilled in the art that different circuit configurations can be employed to accomplish the objectives of this invention without departing from its spirit and accordingly it is intended to limit the scope of the invention only as indicated in the following claims.

What is claimed is:

1. A system for providing digital signals to a channel in a self-clocking format, said system comprising:

means for receiving data words to be applied to said data channel;

said data words comprising a sequence of digital bits of plural levels;

means for generating a signal having transitions between maximum and minimum signal levels in response to each of said bits in received data words;

means responsive to a predetermined bit level in said recieved data words for producing an additional transition in said generated signal coincident with said predetermined bit level; and means for applying said generated signal with said additional transitions to said channel.

2. The system for providing digital signals to a channel of claim 1 further including:

means for extending the time between transitions in said generated signal after said received data words.

3. The system of claim 1 further including:

means for recovering the signal applied to said channel;

means responsive to the interval between transitions in said recovered signal for providing a first output signal when said interval exceeds a predetermined portion of the period between bits in received data words, said predetermined portion being intermediate 50 percent and 100 percent of said period;

means operative in response to the interval between transitions in said recovered signal for providing a second output signal whenever said interval is less than a further predetermined portion of the period between bits in received data words, said further predetermined portions being intermediate 50 percent and 100 percent of said period; and means for providing a digital output signal with a first level in response to said first output signal; and means for providing said digital output signal with a second level in response to said second output signal thereby to provide a reproduction of said received data words.

4. The system of claim 3 further including:

means responsive to the interval between transitions in said recovered signal for providing a third signal in response to the interval between transitions exceeding the period between bits; and means responsive to said third signal for providing a separation in said digital output signal thereby to define framing for said data words.

5. A data system for providing self-clocking digital representations of data words to a data channel comprising:

means for receiving said data words at a particular data pulse rate;

means for generating a clock signal related to said data pulse rate;

means responsive to said clock signal for providing a first timing signal having a predetermined phase relationship to said data pulse rate;

means operating in response to said clock signal for providing a second timing signal substantially out of phase with said first timing signal;

means operative to determine coincidence between said first timing signal and a first binary state in said received data words to provide a first gating signal;

means for combining said first gating signal and said second timing signal to provide a second gating signal;

means operative in response to said clock signal to provide frame signal pulses with an interval between pulses corresponding to the interval between data words;

means for producing a binary signal having transitions responsive to pulses in said second gating signal;

means operative in response to said frame signal pulses for inhibiting transitions in said binary signal for a predetermined interval greater than the period between pulses in said received data words and in synchronism with said frame signal pulses; and means for applying said binary signal to said data channel.

6. The data system of claim 5 further including:

means for recovering the signal applied to said data channel;

means for detecting peak amplitudes in said recovered signal;

means for generating a pulse in response to each detected amplitude peak;

means for generating a first interval having a duration intermediate 50 percent and 100 percent of the shortest period between pulses in said received data words at said particular rate;

means for producing a first control signal in response to generated pulses subsequent to the running of said first interval;

means for triggering said first interval in response to said first control signal;

means for producing a second control signal in response to generated pulses occurring during the running of said interval; and means for producing a binary output signal having a first level in response to said first control signal and a second level in response to said second control signal.

7. The data system of claim 6 further including:

means for generating a medical analog signal representative of body processes;

means operative in response to said frame signal pulses for generating a ramp signal in the interval between said frame signal pulses;

means for comparing said medical signal and said ramp signal and operative to provide a compare signal representative of preset relationship in the levels of said two signals;

means for counting at a predetermined rate substantially in excess of said data pulse rate in the interval between frame signal pulses and said compare signal; and means for forming said data words to represent the count of said counting means coincident with said compare signal.

8. The data system of claim 7 further including:

means responsive to said generated pulse for producing a second interval having a duration greater than the period between pulses in said received data words;

means for providing a third control signal in response to the interval between pulses in said generated pulses exceeding said second interval;

a shift register operative to receive said binary output signal at the rate of said first control signal; and buffer register means operative to receive the contents of said shift register in response to said third control signal.

9. The data system of claim 8 further including:

means operative in response to the signal in said buffer register for providing an analog output signal representative of the digital magnitude of said signal in said buffer register; and means for filtering said analog output signal to provide a reproduction of said medical analog signal.

10. The data system of claim 9 wherein said channel is a magnetic disk recorder.

11. A method for providing digital signals in a self-clocking format comprising the steps of:

receiving said digital signals as binary data words at a known data pulse rate;

providing a pulse sequence synchronized to said known data pulse rate;

generating a binary signal having transitions of a first set between first and second levels in response to said pulse sequence;

detecting a predetermined signal level in the received binary data words; and producing a transition in said binary signal intermediate the transitions of said first set in response to the detection of said predetermined signal level.

12. A system for providing self-clocking data signals comprising:

a shift register;

means for loading said shift register with a data word;

means for generating clock pulses;

means for generating a data pulse intermediate each of said clock pulses;

means for applying said clock pulses to said shift register to provide a serial data output from said shift register;

a gate responsive to said serial data output and said data pulses to provide a coincidence indicating signal in response to simultaneous existence of a data pulse and a predetermined signal level in said serial data output;

means for combining said coincidence indicating signal and said clock pulses to provide a self-clocking pulse train;

a bistable circuit having first and second stable output levels and an input responsive to pulses to shift the output level of said bistable circuit; and means for applying said self-clocking pulse train to the input of said bistable circuit to provide said self-clocking data signals at the output of said bistable circuit.

13. The system of claim 12 further including:

means for generating a frame pulse to indicate intervals between data words in the serial data output of said shift register; and gating means responsive to said self-clocking pulse train and said frame pulse to block the application of said pulse train to the input of said bistable circuit coincident with said frame pulse for a duration greater than the interval between pulses in said clock pulse.

* * * * *